July 2, 1935. F. B. YINGLING 2,006,379
COAL MINING MACHINERY
Filed Aug. 12, 1932   9 Sheets-Sheet 1

INVENTOR
FRANK B. YINGLING.
BY

ATTORNEYS

July 2, 1935.　　　F. B. YINGLING　　　2,006,379
COAL MINING MACHINERY
Filed Aug. 12, 1932　　9 Sheets-Sheet 2

INVENTOR
FRANK B. YINGLING.
BY
ATTORNEYS

July 2, 1935. F. B. YINGLING 2,006,379
COAL MINING MACHINERY
Filed Aug. 12, 1932 9 Sheets-Sheet 5

INVENTOR
FRANK B. YINGLING.
BY
ATTORNEYS

July 2, 1935.  F. B. YINGLING  2,006,379
COAL MINING MACHINERY
Filed Aug. 12, 1932  9 Sheets-Sheet 8

INVENTOR
FRANK B. YINGLING.
BY
ATTORNEYS

Patented July 2, 1935

2,006,379

UNITED STATES PATENT OFFICE 2,006,379

COAL MINING MACHINERY

Frank B. Yingling, Hamilton, Ohio, assignor to Cyrus J. Fitton, Hamilton, Ohio

Application August 12, 1932, Serial No. 628,572

18 Claims. (Cl. 262—28)

This invention relates to improvements in coal mining machines, and has for its object to provide a coal mining machine with a cutter bar which may be positioned and operated in any position from an upper horizontal one to a lower horizontal one, and may swing through an angle of at least 180 degrees, as well as have a capacity for cutting at various angles in a vertical plane.

It is also an object of this invention to provide, in connection with a coal mining machine, means for supporting a cutter bar and operating it at various angles to the horizontal and to the vertical.

It is also an object of this invention to provide, in connection with a coal mining machine, means for supporting a cutter bar in a horizontal position and operating and adjusting the cutter bar through an angle of 180 degrees when so positioned as well as in various vertical positions.

It is a further object of this invention to provide, in connection with means for variously adjusting the position of the cutter bar, electrically operated brakes for holding the bar in any adjusted position, and to provide electrically operated clutch mechanism for connecting the operating parts of the mechanism to a source of power, the clutch mechanism and the brake mechanism being so interconnected that when one is operated the other is idle.

These and other advantages will appear from the following description taken in connection with the drawings.

Referring to the drawings.

The present coal mining machine is adapted to be transported on a trackway A, which consists of a body or chassis having a floor 1, sides 2 and a front head member 3, all formed integral with one another. The body is supported in the present instance by two axles 4, each of which has on each end a wheel 5. On each axle between the wheels is a worm gear 6, meshing with a worm 7 on a longitudinal shaft 8.

This shaft is driven by means of a motor 9, through a clutch mechanism consisting of a clutch element 10 affixed to one end of the shaft, and a second clutch element 11 slidably mounted on the motor shaft but adapted to engage the clutch element 10 on the end of the shaft 8. The clutch element 11 is slidable upon the shaft of the motor by means of a lever 12, suitably pivoted to some part of the body and connected at one end to one end of a link 13, which has its other end connected to a clutch operating lever 14 pivoted to the floor.

This motor and its cooperating shaft and clutch members will propel the body along the track. In the rear end of the body and transversely thereof is a motor 15, which has on its shaft a worm 16 engaging on a worm gear 17 located on a longitudinally disposed shaft 18 at one side of the body. The worm gear 17 is at one end of this shaft 18 while on its other end there is a pinion 19 which engages an internal gear 20 formed on a rotating head.

This head has a rearwardly extending hub 21, which projects into a suitable bearing formed in the head 3. By means of the shaft 18 and the pinion 19 on the end thereof engaging the internal gear head, the head may be rotated about the bearing for the hub 21.

Around the periphery of the gear head is a casing 22, somewhat rectangular in shape, and which has located in each corner a roller or bearing 22a which serves to guide and stabilize the movement of the head due to the operation of the head-driving motor and shaft. Centrally located in the body between the side walls is a third motor 23, which has the usual motor shaft and a pinion 24 on the end thereof engaging an internal gear 25 mounted upon a shaft 26 supported in a suitable bearing provided therefor in the head 3. The end of the shaft 26, remote from the internal gear 25, has thereon a pinion 27 which is located within the internal gear head and engaging the outer gear teeth on a gear 28 supported for rotation on the shaft or spindle 21.

This gear 28 has internal teeth which mesh with a pinion 29 located on one end of a shaft 30, journalled in a bearing 31 formed on the front side of the gear head 20. On the other end of the shaft 30 is a bevel gear 32 which meshes with a second bevel gear 33 located on a transversely extending shaft 34 supported at each end by a bracket 35 formed integral with the front side of the internal gear head. The forward edge of each bracket 35 has teeth 36 arranged thereon, equally spaced from the shaft 34 supported by the bracket 35.

This shaft 34 serves as a pivotal support for the rear end of a link structure consisting of side bars 37 connected by a plurality of cross bars 38, which form supports for operating mechanism supported by the link structure. Meshing with the bevel gear 33 is another bevel gear 39 located on one end of a longitudinally extending shaft 40, which is supported by means of the cross bars 38 of the link structure.

Figure 1:
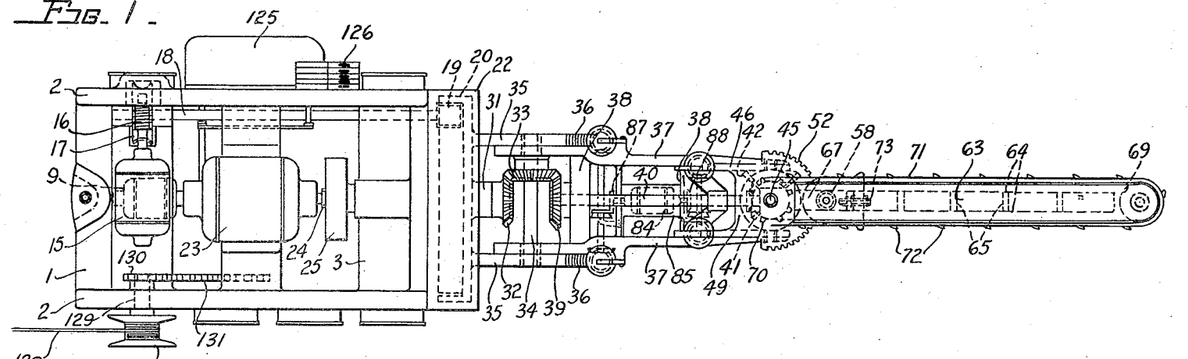
Figure 1 is a top plan view of the coal mining machine.
Figure 2:
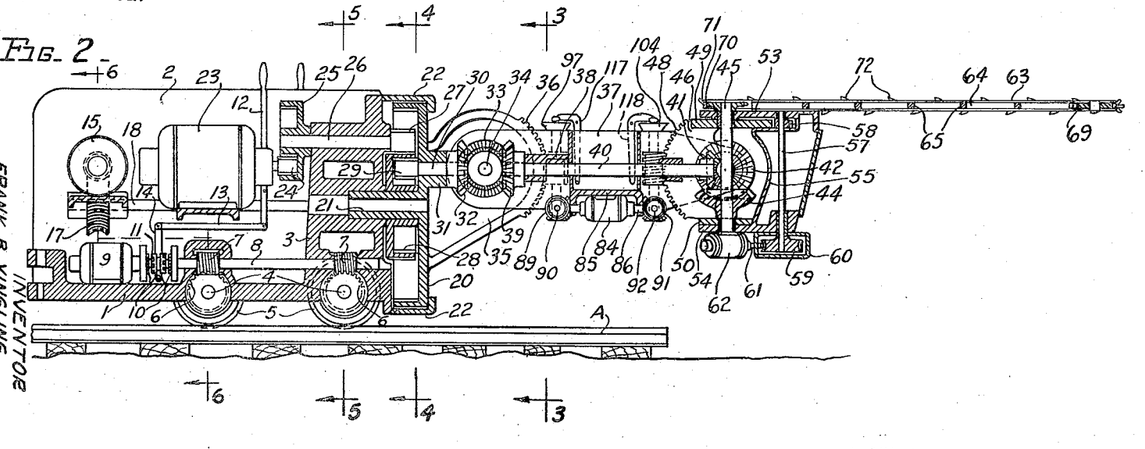
Figure 2 is a vertical longitudinal section through the machine as shown in Figure 1.
Figure 3:
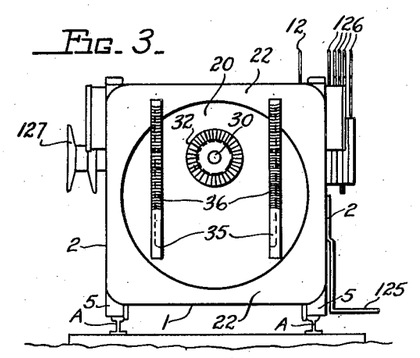
Figure 3 is a section on the line 3—3 of Figure 2.
Figure 4:
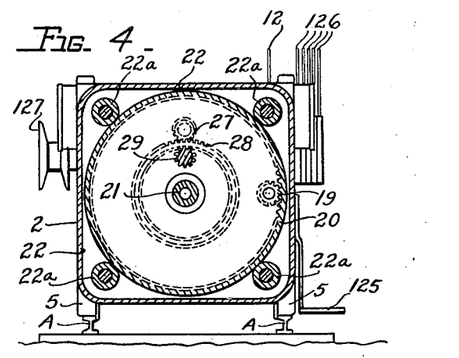
Figure 4 is a section on the line 4—4 of Figure 2.
Figure 5:
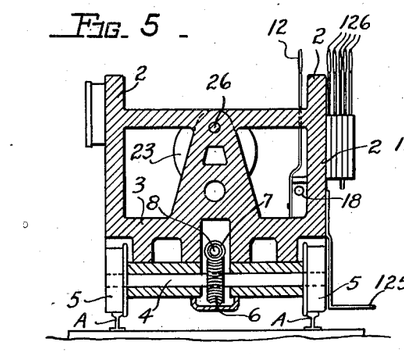
Figure 5 is a section on the line 5—5 of Figure 2.
Figure 6:
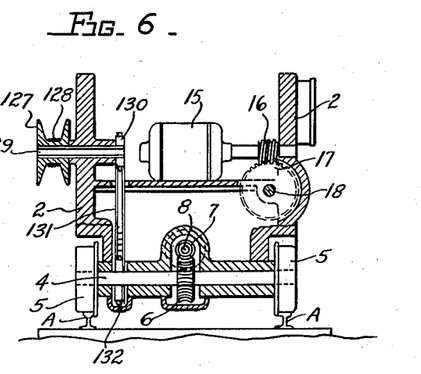
Figure 6 is a section on the line 6—6 of Figure 2.

On the other end of this shaft 40 is a bevel gear 41 which meshes with a bevel gear 42 located on a shaft 43. This gear 42 also meshes with a gear 44 located on a vertically disposed shaft 45. This shaft is shown to be vertical in both Figures 1 and 2, but may during the operation of the machine assume other positions.

While only one shaft 43 has a bevel gear thereon, there are two of these shafts, each supported by the front end of one of the sides of the link structure. Supported on the front ends of these side members of the link structure is a swivel head consisting of side plates 46, an upper plate 49 and a lower plate 50 connecting the two side plates. In each side plate is a hole 47 for receiving the shaft 43. Concentrically with the shaft 43 and equally spaced from each shaft on each side plate are teeth 48 adapted to be engaged by means of a worm gear, later to be described, for tilting the swivel head on the shafts 43.

Each of the plates 49 and 50 has a hole 51 therein which the shaft 45 rotates, and is supported by means of suitable bearings. The front edge of the upper plate has teeth 52 adapted to be engaged by a pinion for rotating the cutter bar, later to be described.

Inclosing the front edge of the swivel head is a casing consisting of an upper plate 53, a lower plate 54 and a vertical connecting wall 55. The upper end of this vertical wall is horizontally disposed, as indicated by the numeral 56, to provide a housing for a pinion 58 located on the upper end of a shaft 57. This shaft is located in suitable bearings in the plates 53 and 54, in front of the vertical partition or wall 55.

On the lower end of the shaft 57 is a worm gear 58 for rotating the shaft 57 and the pinion 58 on the upper end thereof. This pinion 58 engages with the teeth 52 on the front of the plate 49 for swinging the cutter bar about the vertical shaft 45. This worm is located in a housing 60 located beneath the plate 54, and is operated by means of a worm shaft 61, through a motor 62 also located beneath the plate 54.

Figures 18, 19:
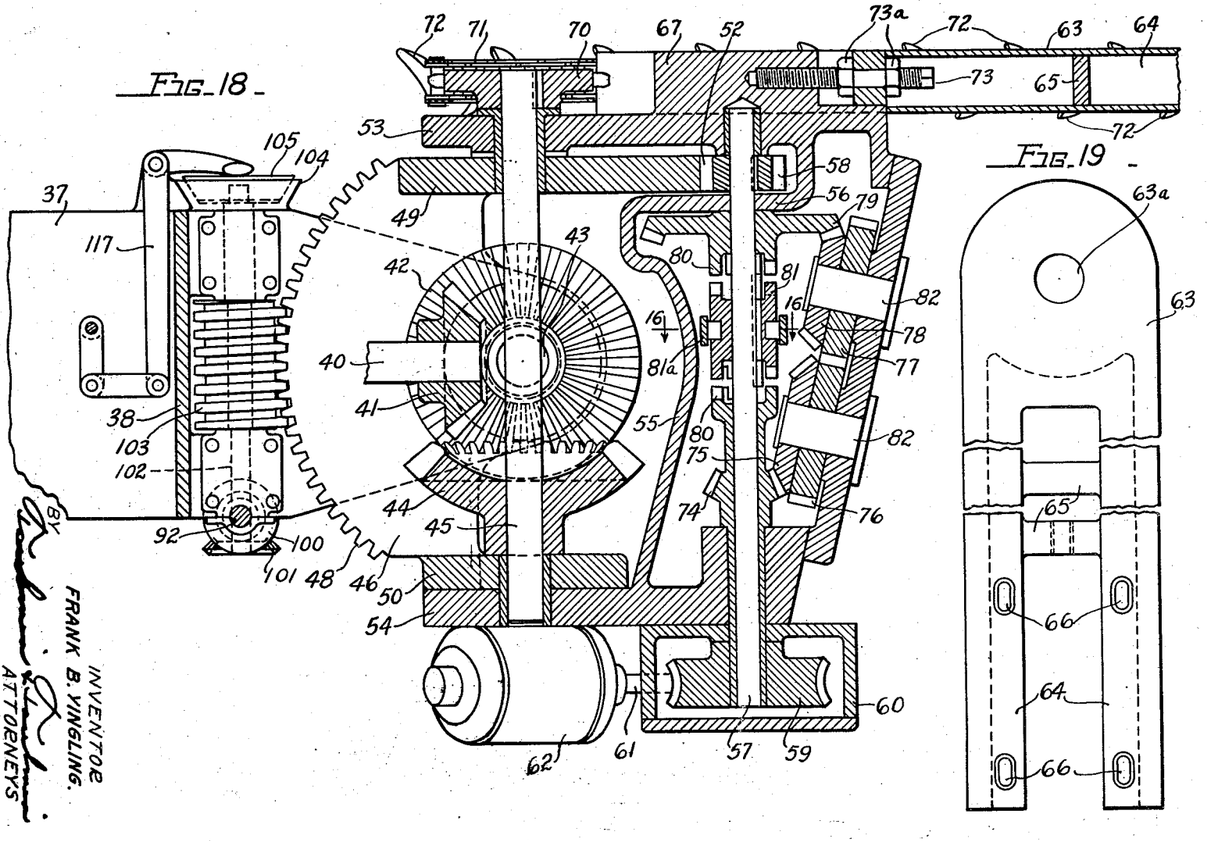
Figure 18 is a vertical section through the swivel head of the cutter bar and the front end of the link supporting the cutter bar.
Figure 19 is a top plan view of the cutter bar, parts thereof being broken away.
Figures 20, 28, 29, 30:
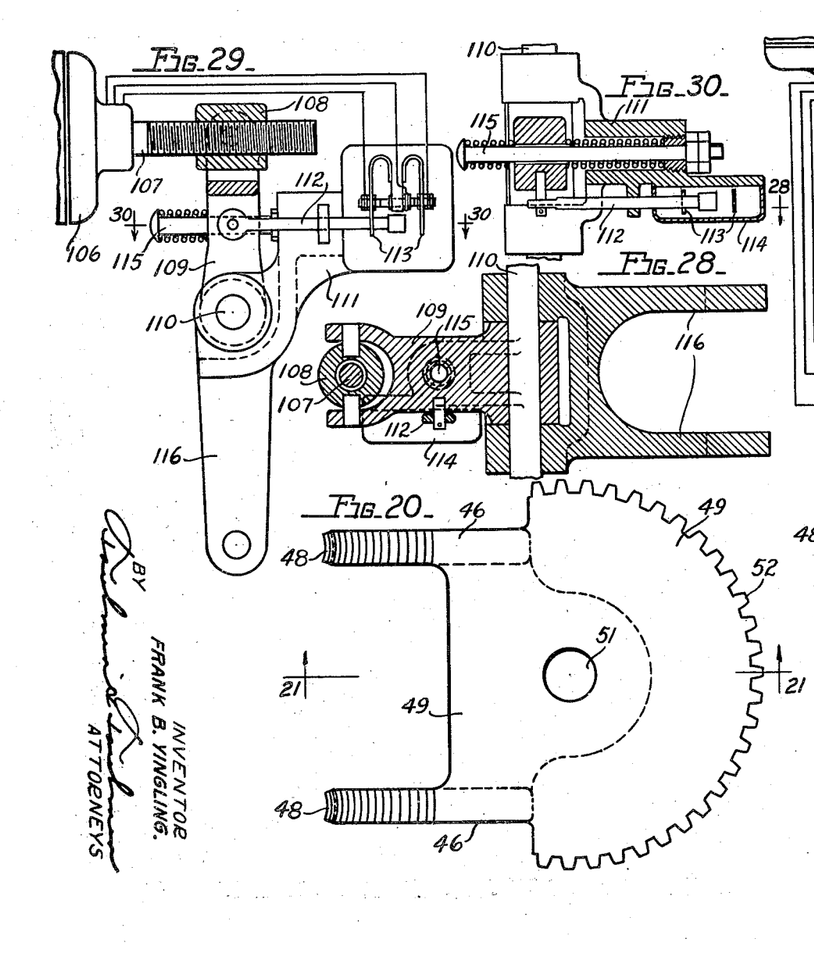
Figure 20 is a top plan view of the connection between the front end of the link and the rear end of the cutter bar.
Figure 28 is a section on the line 28—28 of Figure 27.
Figure 29 is a view similar to Figure 27, but showing the connection between the motor shaft and the clutch lever in section.
Figure 30 is a section on the line 30—30 of Figure 29.
Figure 21:
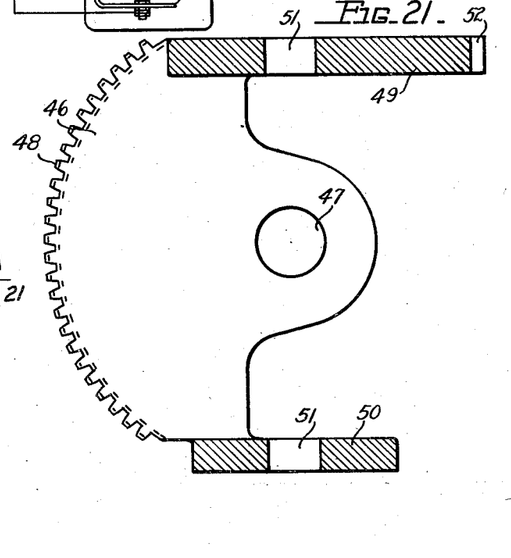
Figure 21 is a section on the line 21—21 of Figure 20.

In Figure 19 there is shown a top plan view of the cutter bar 63, which has in its front end a hole 63a for receiving the axle of a sprocket wheel. This cutter bar consists largely of two spaced arms 64, connected at intervals by means of cross bars 65. Near the rear end of each arm is a plurality of elongated holes 66 adapted to receive bolts for supporting and holding the cutter bar in a fixed position upon the top of the casing supported on the swivel head. The rear ends of the arms are supported on the top of the casing, with a boss 67 between the arms. This boss is formed integral with the upper plate 53.

Located on the upper end of the shaft 45 is a sprocket wheel 70, which together with the sprocket wheel 69 located in the front end of the cutter bar, support a sprocket chain 71 for rotation around the periphery of the cutter bar. This chain carries thereon a plurality of blades or knives 72, used for the purpose of loosening the coal or cutting a way through a stratum of coal.

In order to properly adjust and position the cutter bar on its support there is provided a screw 73, which passes through the rearmost cross bar 65, into the boss 67, as clearly shown in Figure 18. This screw is held in adjusted position by means of nuts 73a.

On the front end of the casing which supports the rear end of the cutter bar are cutter bar swivel back gears used as alternative structure. This gear mechanism consists of a bevel pinion 74 loosely mounted on the shaft 57. This pinion engages another bevel gear 75, which has rigidly attached thereto a pinion 76 meshing with a pinion 77, which has attached integrally therewith a bevel gear 78 which meshes with a bevel gear 79 loosely mounted upon the upper end of the shaft 57 beneath the part 56.

Integral with the pinion 74 and the bevel gear 79 is a clutch member 80. Between these clutch members and slidably mounted on the shaft 57 is a cooperating clutch member 81 adapted to engage either of the clutch members 80 for causing the pinion 74 or the gear 79 to rotate with the shaft 57. The bevel gear 75, pinion 76, the bevel gear 78 and the pinion 77 are supported by means of stub shafts 82 supported by a front plate 83.

Figures 22, 23, 24:
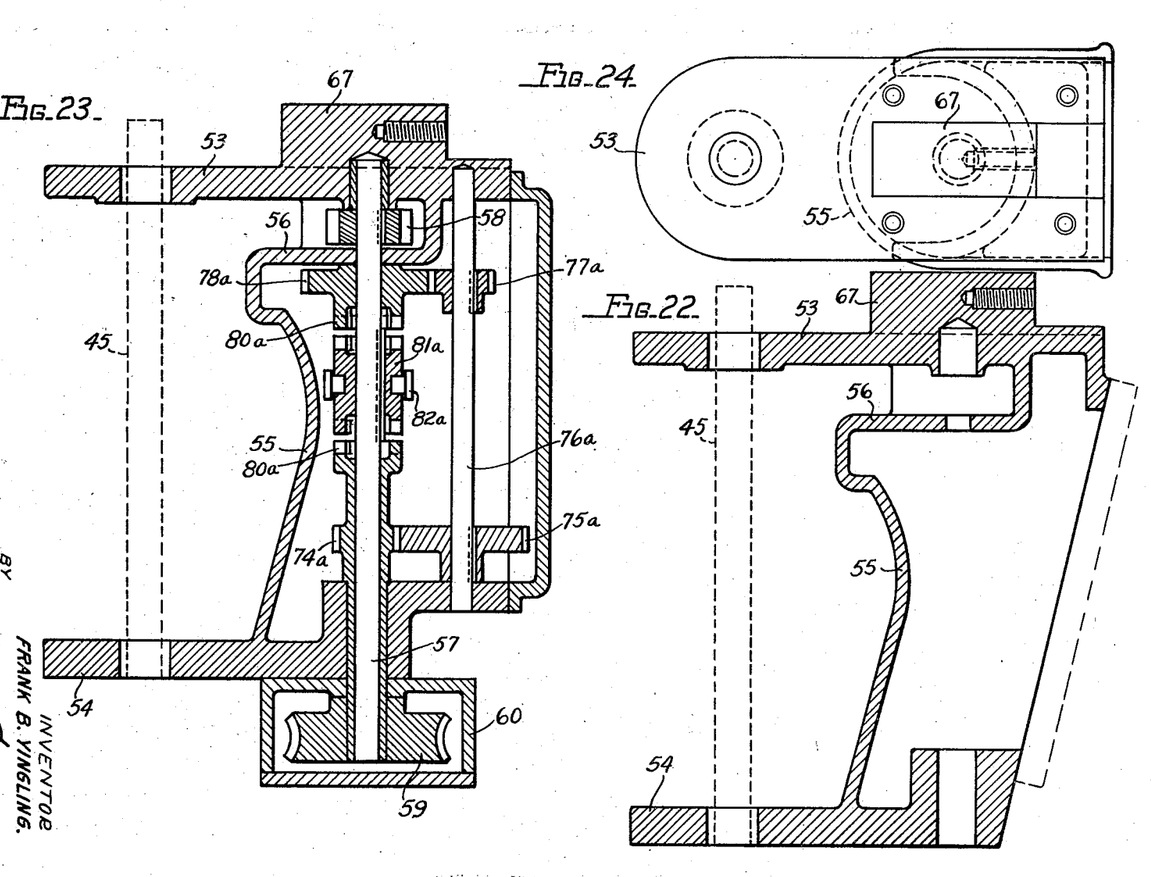
Figure 22 is a vertical section through the head casing supporting the rear end of the cutter bar.
Figure 23 is a view similar to Figure 22 with a modified form of bar rotating mechanism shown in connection therewith.
Figure 24 is a top plan view of the mechanism shown in Figure 22.
Figure 25:
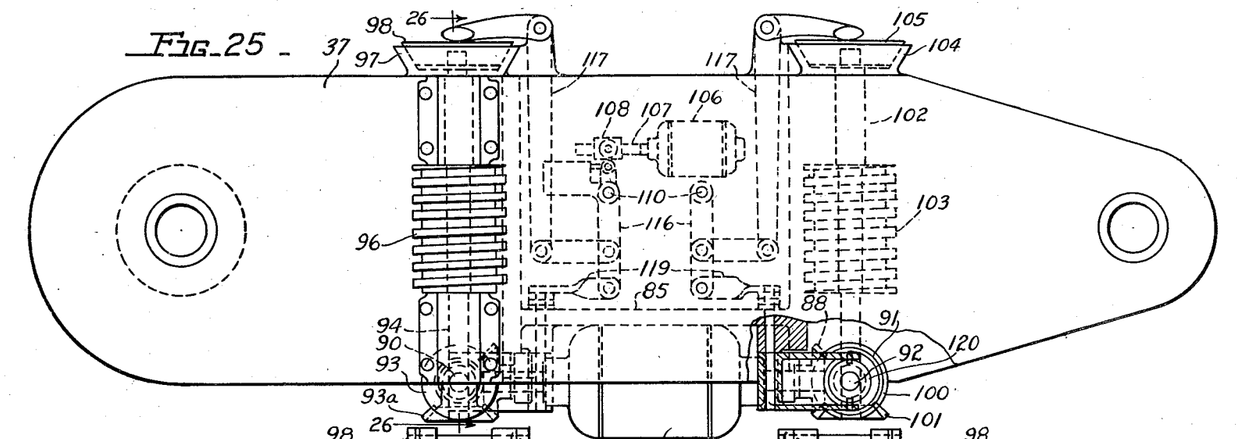
Figure 25 is a side elevation of the link for connecting the cutter bar to the truck.
Figure 26:
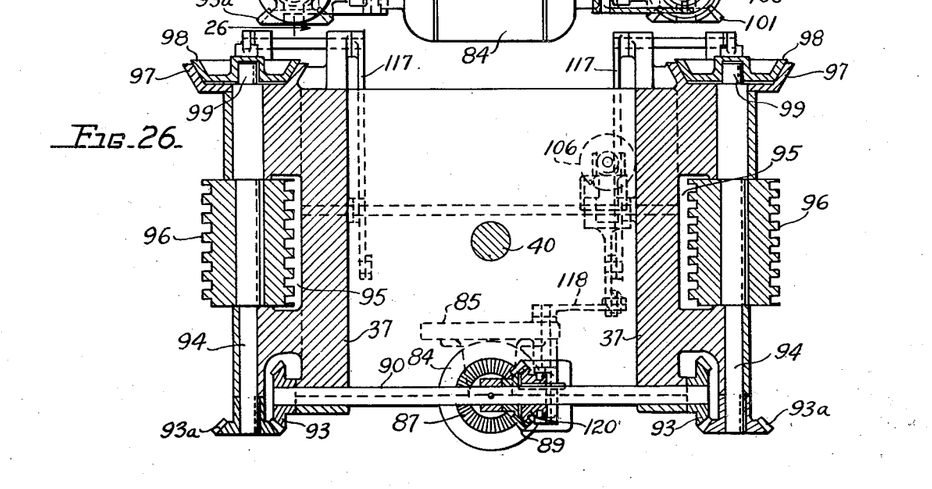
Figure 26 is a section on the line 26—26 of Figure 25.
Figure 27:
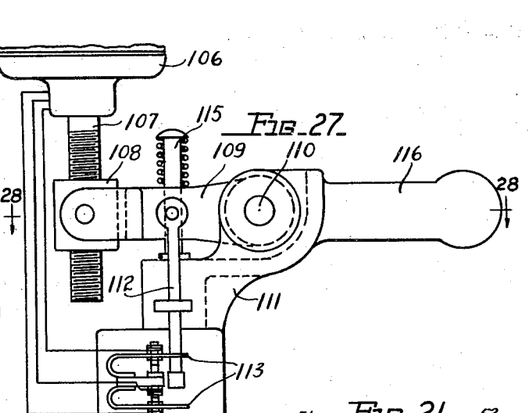
Figure 27 is a top plan view of one end of the clutch and brake operating motor and the clutch lever operated thereby.

In the construction shown in Figure 23, instead of having the bevel gears 75 and 78 and their associated pinions 76 and 77, the pinion 74a, as shown in this figure, engages the gear 75a mounted on a vertical shaft 76a, which has adjacent its upper end a pinion 77a meshing with a gear 78a located at the upper end of the shaft 57. The pinion 74a and the gear 78a have a clutch member 80a similar to that shown in Figure 18.

Figure 16:
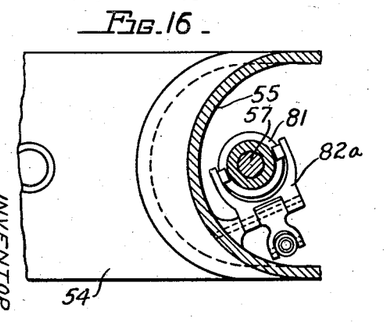
Figure 16 is a section on the line 16—16 of Figure 18.
Figure 17:
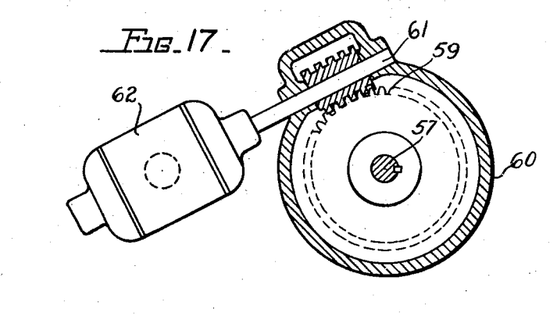
Figure 17 shows the motor, the gear operated thereby and the housing for inclosing the gear that swings the cutter bar on the front end of the link.

These clutch members are adapted to be engaged by a sliding clutch 81a mounted upon the shaft 57 for rotation therewith. The clutches 81 and 81a are operated by a clutch lever 82a, as shown in Figure 16.

For elevating the cutter bar and the link structure connecting the cutter bar to the truck, a motor 84 is supported on the link structure, beneath a platform 85. This motor has a shaft 86, which extends from both ends thereof and has on its rear end a bevel gear 87 and on its front end a bevel gear 88. The bevel gear 87 meshes with a bevel gear 89 located on a transversely extending shaft 90, suitably supported in some bearings in the link structure.

The bevel gear 88 meshes with a bevel gear 91 located on a transversely extending shaft 92 parallel to and supported in the same manner as shaft 90. On each end of the shaft 90 is a bevel gear 93, each of which engages a bevel gear 93a located on the lower end of a vertical shaft 94, supported on one of the side bars 37 of the link structure.

In order to accommodate a worm 96 the side of the link structure is cut out, as indicated by the numeral 95. At the top of the shaft 94 on the member 37, and integral therewith, is a clutch element 97 which is somewhat saucer-shaped and has cooperating therewith a clutch element 98, located on the reduced end 99 of the vertical shaft 94. This clutch element 98 is loosely mounted upon the reduced end 99 so that it may have a slight vertical movement but will rotate with the shaft. There are two of these worms 96, meshing with the teeth 36 on one of the brackets 35.

On each end of shaft 92 is a bevel gear 100 which meshes with a gear 101 on a vertical shaft 102, which is constructed and operated similarly to the shaft 94, but instead of being located near the rear end of the link structure is located near the front end of the link. On each shaft 102 is a worm 103, similar to the worm 96, for engaging the teeth 48 on the swivel head located at the front end of the link structure. On the link structure, at the top of each shaft 102, is a clutch element 104 similar to the clutch element 97, and has cooperating therewith a clutch element 105.

By operating the motor 84 the worms 96 and 103 may rotate for the purpose of tilting the link structure or for the purpose of elevating the cutter bar. The movements of the link structure and the cutter bar are controlled by a brake and clutch mechanism, about to be described.

Suitably located in the link structure are two motors 106, each having a shaft 107. One of these motors is used to operate the clutch and the brake mechanism used in connection with the operation of the worms 96. The other is used in connection with the operation of the worms 103. Both operate on the same type of mechanism for producing the same results, and therefore the description of one set of mechanism will apply to the other set of mechanism. The same reference characters are used for the corresponding parts connected with each motor.

Located on each motor shaft, which is threaded, is a trunnion nut 108 which is pivoted to the forks of a fork lever 109, suitably mounted upon a shaft 110 which extends transversely of the link structure. The numeral 111 is used to designate a lever bracket for operating the switch control. The switch operating plunger 112 is provided in connection with the lever bracket for making and breaking a contact with switches 113, inclosed within a suitable switch housing 114.

Extending through the fork lever and the lever bracket is a retaining bolt 115. The lever bracket is located on the shaft 110 and has extending therefrom or attached to the shaft an arm 116. There are two of these arms, one at each end of the shaft 110. The swinging of this arm will cause the operation of the clutch members and the braking apparatus. As the motor shaft rotates in one direction the lower end of the arm 116 will swing in one direction, and on the rotation of the motor shaft in the other direction the arm 116 will swing in the reverse direction.

One arm 116 is connected to a brake lever 117, while the other arm is connected to a clutch lever 118 by means of a suitable link connection 119. The clutch levers are used for the purpose of sliding a clutch 120 located on the shaft 90 and on the shaft 92. These clutches, one on each of these shafts, are for the purpose of causing the bevel gears 89 and 91, which are loosely mounted on the shafts, to rotate with the shafts.

The link connection between the arms 116 and the brake levers and clutch levers is such that when the motor shaft rotates in one direction it will release the clutches and cause the brakes to operate. In the reverse rotation the clutches will be forced into engagement while the brakes will be released.

Figures 13, 14:
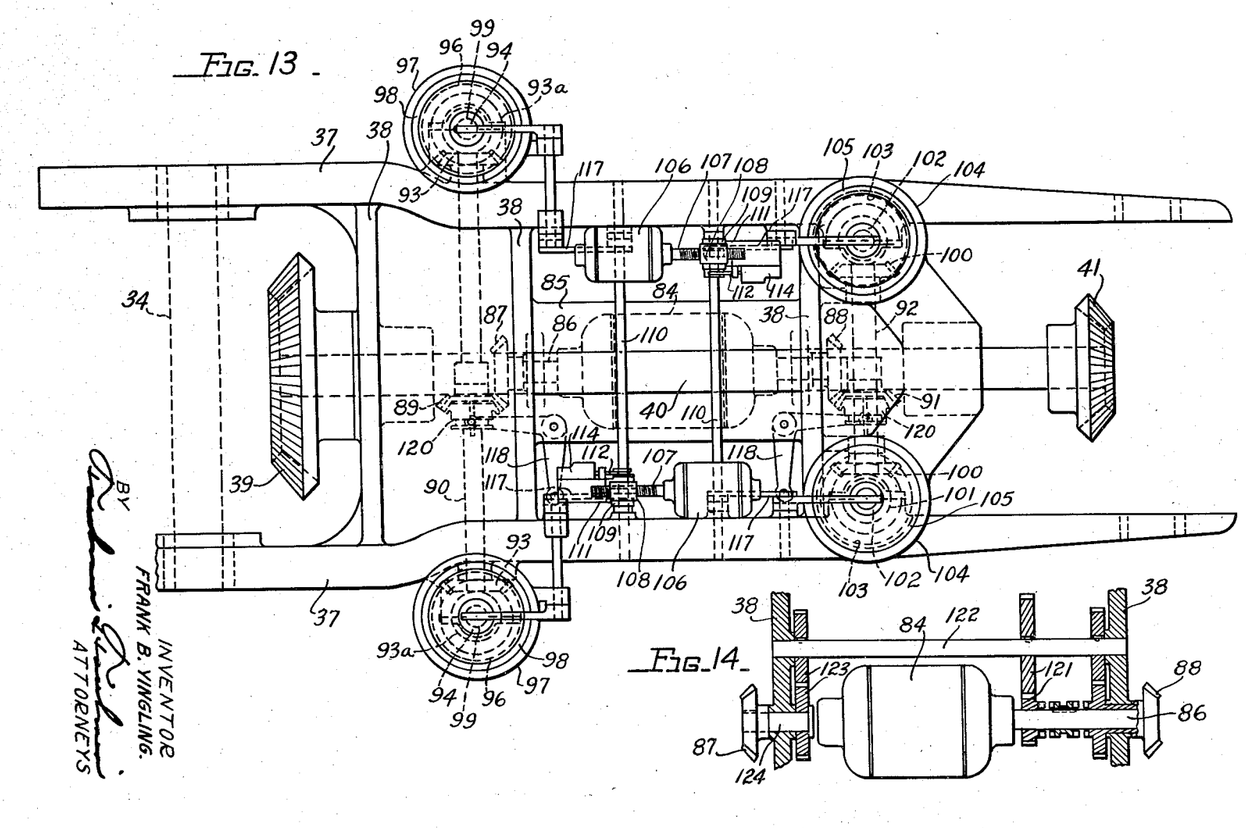
Figure 13 is a top plan view of the link connection between the truck body and the cutter bar.
Figure 14 shows the motor and one form of gear mechanism for operating the clutches.
Figure 15:
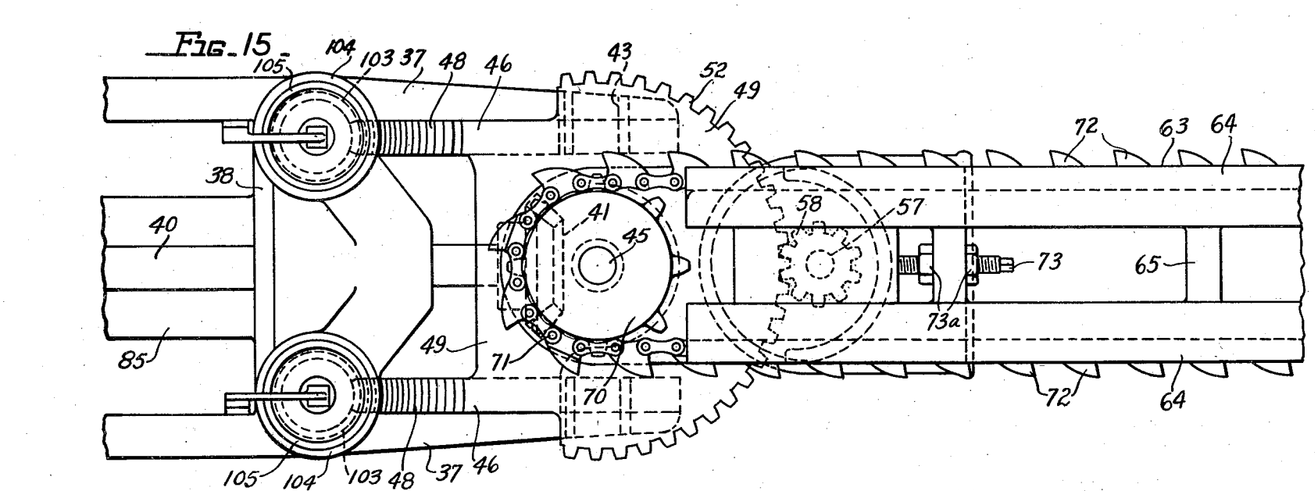
Figure 15 is a top plan view of the forward end of the link and the swiveled head of the cutter bar.

Instead of having the shaft on the motor 84 continuous it may be broken, as shown in Figure 14, with the shaft extending from one end to operate the bevel gear 88. This shaft also operates through gears 121, a shaft 122, which operates through gears 123 a small shaft 124 carrying the bevel gear 87. By this means both gears 87 and 88 rotate in unison. As indicated in Figure 14, if desired a speed reducing mechanism operated through a shifting clutch may be employed.

On the lefthand side of the truck is a platform 125, upon which the operator stands for manipulating current-controlled levers 126. On the other side of the truck or vehicle is a cable reel 127, which has attached thereto a cable 128. This reel is on a shaft 129, suitably supported in one side of the truck, and has on its inner end a sprocket wheel 130 which has around it a sprocket chain 131, which passes around a sprocket wheel 132 located upon one of the axles 4. This axle 4 is the one by which the truck is driven along the trackway. Through the rotation of this axle 4 the cable reel 127 is caused to rotate.

Figures 7, 8:
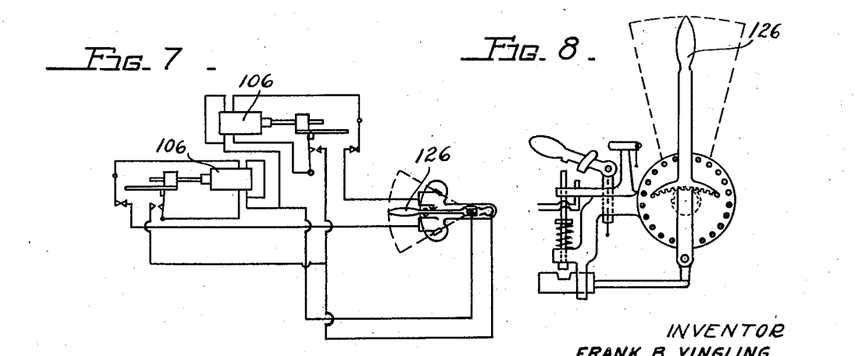
Figure 7 shows three switches that interlock with the hand controls to operate two small motors on the link for operating the clutches and applying the brakes, one for each end mechanism of the link and one for operating the rapid transverse movements of the cutter bar.
Figure 8 shows one of the five electric controllers for operating the motor for moving the truck, for rotating the cutter bar, for moving the link to deflect the cutter bar and for swiveling the cutter bar, and one for the cutter drive.
Figures 9, 10, 12:
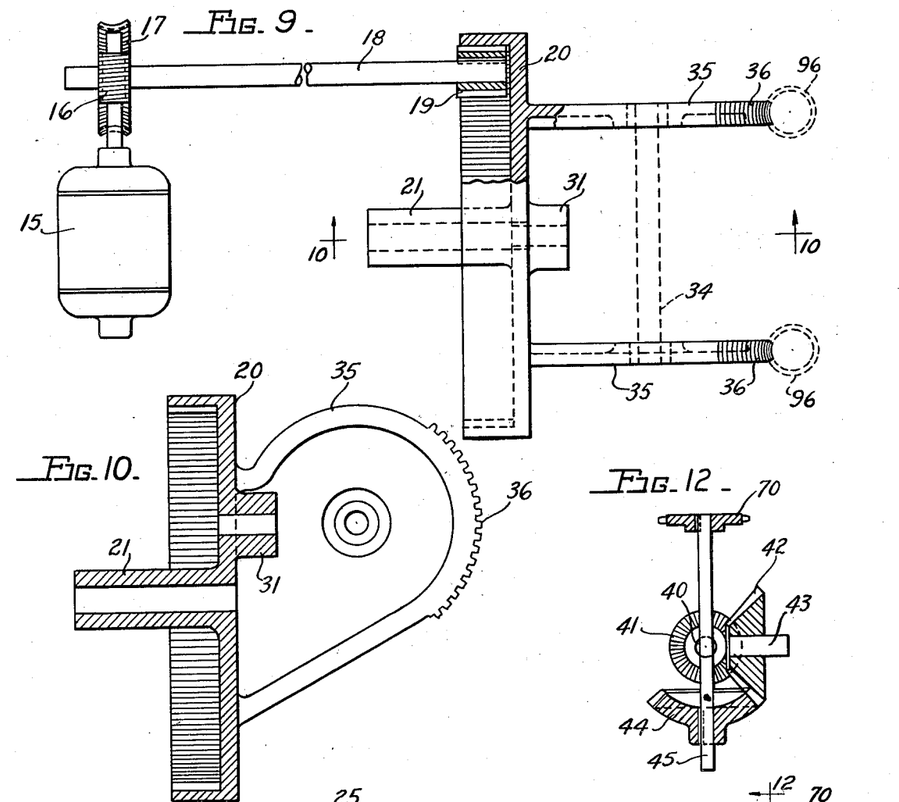
Figure 9 shows the rotating motor and the connection between the motor and the rotating head.
Figure 10 is a section on the line 10—10 of Figure 9.
Figure 12 is a section on the line 12—12 of Figure 11.
Figure 11:
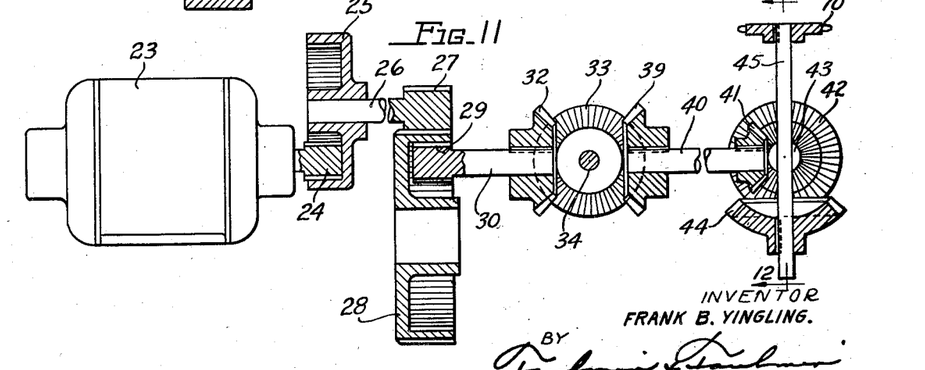
Figure 11 is a view showing the motor and a section through the gear mechanism for rotating the cutter chain drive.

In Figure 8 there is shown one of the five electric controllers for operating the motor, as above described, one for moving the link structure to deflect the cutter bar in various planes, one for swiveling the cutter bar, and one for the cutter drive.

The details of the wiring form no part of the present invention.

In Figure 7 three switches are shown that interlock with the hand controllers to operate the two small motors on the link structure for operating the clutches and applying the brakes, one for each end mechanism of the link structure, and one for operating the rapid reverse of the cutter bar when required.

It will be understood that it is desired to comprehend within this invention such modifications as come within the scope of the claims and the invention.

Having thus fully described my invention, what I claim as new and desire to secure by Letters Patent, is:

1. In a coal mining machine, a chassis, means for moving the chassis with respect to the ground, a rotatable supporting head thereon, said head having a hub, means on the chassis for rotating the head, a cutter carried by the head, and means on the chassis for driving the cutter irrespective of the rotative position of the head, said last-named means including a gear mounted on the hub.

2. In a coal mining machine, a chassis, means for moving the chassis with respect to the ground, a rotatable supporting head thereon, said head having a hub, means on the chassis for rotating the head, a cutter carried by the head, means on the chassis for driving the cutter irrespective of the rotative position of the head, said last-named means including a gear mounted on the hub, and means for adjusting the cutter to different angular positions.

3. In a coal mining machine, a chassis, means for moving the chassis with respect to the ground, a rotatable supporting head thereon, said head having a hub means on the chassis for rotating the head, a cutter carried by the head, means on the chassis for driving the cutter irrespective of the rotative position of the head, said last-named means including a gear mounted on the hub, and means to adjust the cutter to different elevations.

4. The combination in a coal cutting machine of a chassis having a head member having a central bearing, means for driving the chassis with respect to the ground, a rotatable head mounted on the chassis and having a hub projecting into the bearing, means on the chassis for rotating the head, cutter driving means on the chassis extending through the head to a cutter, said driving means including a gear on the hub, and a cutter mounted on the head.

5. The combination in a coal cutting machine of a chassis, means for driving the chassis with respect to the ground, a rotatable head mounted on the chassis, means on the chassis for rotating the head, cutter driving means on the chassis extending through the head to a cutter, said driving means comprising a gear rotatably supported by the head and engaging two other gear members, a cutter mounted on the head, and means to adjust in a horizontal plane the cutter about a vertical axis with respect to said head.

6. The combination in a coal cutting machine of a chassis, means for driving the chassis with respect to the ground, a rotatable head mounted on the chassis, means on the chassis for rotating the head, cutter driving means on the chassis extending through the head to a cutter, a cutter mounted on the head, means to adjust in a horizontal plane the cutter about a vertical axis with respect to said head, and means to adjust the angular position of the cutter with respect to the head, said last-named means including a link structure having thereon a motor and a gear mechanism operated by the motor.

7. The combination in a coal cutting machine of a chassis, means for driving the chassis with respect to the ground, a rotatable head mounted on the chassis, means on the chassis for rotating the head, cutter driving means on the chassis extending through the head to a cutter, a cutter mounted on the head, means to adjust in a horizontal plane the cutter about a vertical axis with respect to said head, means to adjust the angular position of the cutter with respect to the head, and means to adjust the elevation of the cutter with respect to the head, said last two means including a link structure having thereon a motor and a gear mechanism operated by the motor.

8. In a coal mining machine, a chassis having a supporting front wall, an internal gear pivotally mounted on said front wall guided and supported by rollers at spaced points on the external portion of said gear, a motor, and driving means connected thereto engaging with said internal gear to rotate it, a second motor, drive mechanism driven thereby extending to a point adjacent the interior of said ring gear, and means carried by said ring gear extending therebeyond for driving a coal cutter adapted to be driven by said second motor, said driving means comprising an internal and an external gear mounted on the pivot of said first mentioned internal gear.

9. In combination in a coal mining machine, a chassis, rollers on the end thereof, an internal ring gear mounted with said rollers, means engaging said gear for rotating it, a hub extending into the chassis for pivotally supporting said ring gear on said chassis, cutter driving means carried by said ring gear, means for actuating said cutter driving means carried thereby from a point on said chassis to a point beyond said ring gear, and cutter means driven thereby mounted on said ring gear.

10. In combination in a coal mining machine, a chassis, rollers on the end thereof, an internal ring gear mounted with said rollers, means engaging said gear for rotating it, a hub extending into the chassis for pivotally supporting said ring gear on said chassis, cutter driving means carried by said ring gear, means for actuating said cutter driving means carried thereby from a point on said chassis to a point beyond said ring gear, cutter means driven thereby mounted on said ring gear, and means to adjust said cutter in horizontal planes, vertical planes and to different angular positions.

11. In a coal mining machine, a chassis, a rotatable support mounted thereon for a coal cutter, a coal cutter, a head therefor pivoted on the vertical axis, a link pivotally connecting said head of the cutter to said rotatable head, gearing on said cutter head and rotatable head, gearing on said link engaging therewith, means for alternately driving said gearing to change the elevation and angular position of said cutter, means on said cutter head for rotating said cutter about its vertical axis, and brake means on said link for controlling said gearing and the positioning of said link, rotatable head and cutter head.

12. In a coal mining machine, a chassis, a rotatable head on one end thereof having a projecting supporting bracket with a segmental gear thereon, a link pivoted on said bracket, gearing on said link engageable with said segmental gearing, a cutter head mounted on the free end pivoted thereon, said cutter head having a similar segmental gear pivoted thereon for changing the angular position of the cutter head with respect thereto, motor means on said link for alternately actuating said gears, and brake means for maintaining said link, bracket and head in predetermined positions.

13. In a coal mining machine, a chassis, a rotatable head on one end thereof having a projecting supporting bracket with a segmental gear thereon, a link pivoted on said bracket, gearing on said link engageable with said segmental gearing, a cutter head mounted on the free end pivoted thereon, said cutter head having a similar segmental gear pivoted thereon for changing the angular position of the cutter head with respect thereto, motor means on said link for alternately actuating said gears, brake means for maintaining said link, bracket and head in predetermined positions, and means on said cutter head for rotating said cutter about a vertical axis.

14. In a coal mining machine, a chassis, a rotatable head on one end thereof having a projecting supporting bracket with a segmental gear thereon, a link pivoted on said bracket, gearing on said link engageable with said segmental gearing, a cutter head mounted on the free end pivoted thereon, said cutter head having a similar segmental gear pivoted thereon for changing the angular position of the cutter head with respect thereto, motor means on said link for alternately actuating said gears, brake means for maintaining said link, bracket and head in predetermined positions, means on said cutter head for rotating said cutter about a vertical axis, and means on said chassis passing through said rotatable head, bracket, link and cutter head for actuating said cutter to perform its cutting operations.

15. In a coal mining machine, a chassis having a head with an enclosing ring, rollers therein, a rotatable head mounted on said rollers having spaced brackets with segmental gears thereon, a bifurcated link pivoted between said brackets having gearing engaging with the brackets, gearing for adjusting the angularity of the link with respect thereto, a cutter head having vertically-disposed spaced segmental gears engageable with gearing on said link for adjusting the angular position of said head on the link, a cutter on said cutter head, means on said chassis for driving through said rotatable head, bracket, link and cutter head of said cutter, a motor on said link for actuating the gearing thereon, a motor on said cutter head for rotating the cutter about a vertical axis, and brake mechanism on said link for maintaining said link in its adjusted positions.

16. In a coal mining machine, in combination with a chassis having thereon a rotating head and a cutter head having thereon a cutter bar, means connecting the rotating head to the cutter head comprising a link structure having thereon a gear mechanism operatively connected to the rotating head for elevating the link structure, a second gear mechanism operatively connected to the cutter head for elevating the cutter bar, power means located on said connecting means, means for connecting said power means to either of said gear mechanisms and means simultaneously operating for braking said gear mechanism.

17. In a coal mining machine, in combination with a chassis having thereon a rotating head and a cutter head having thereon a cutter bar, a connection between said rotating head and said cutter bar head comprising a link structure having thereon a pair of worms operatively connected to the rotating head, a second pair of worms operatively connected to the cutter bar head, a motor, a brake for each worm, and means for simultaneously causing certain of said worms to be braked and disconnected from the motor.

18. In a coal mining machine, in combination with a chassis and a cutter bar, a link mechanism for connecting the cutter bar to the chassis, means on the link mechanism for swinging the link mechanism in relation to the chassis, means on the link mechanism for swing the cutter bar in relation to the link mechanism, electrically controlled means for causing said means to operate in conjunction or independent of each other, and means automatically operated for cutting out the electrically operated means at certain periods in the operation thereof.

FRANK B. YINGLING.